US008010594B2

(12) United States Patent
Kumar et al.

(10) Patent No.: US 8,010,594 B2
(45) Date of Patent: Aug. 30, 2011

(54) SYSTEM AND METHOD FOR BILLING SYSTEM INTERFACE FAILOVER RESOLUTION

(75) Inventors: Naresh Kumar, South Riding, VA (US); Robert Perry, Fairfax, VA (US)

(73) Assignee: Time Warner Cable Inc., New York, NY (US)

( * ) Notice: Subject to any disclaimer, the term of this patent is extended or adjusted under 35 U.S.C. 154(b) by 196 days.

(21) Appl. No.: 12/141,203

(22) Filed: Jun. 18, 2008

(65) Prior Publication Data
US 2009/0319596 A1   Dec. 24, 2009

(51) Int. Cl.
G06F 15/16 (2006.01)
G06F 15/173 (2006.01)
H04N 7/16 (2011.01)
H04N 7/173 (2011.01)

(52) U.S. Cl. ........ 709/202; 709/249; 709/250; 709/226; 709/219; 725/1; 725/4; 725/86; 725/116

(58) Field of Classification Search .................. 709/223, 709/224, 225; 725/1, 4, 86
See application file for complete search history.

(56) References Cited

U.S. PATENT DOCUMENTS

| 6,330,605 | B1* | 12/2001 | Christensen et al. ......... 709/226 |
| 2002/0165822 | A1* | 11/2002 | Makipaa ......................... 705/40 |
| 2003/0056217 | A1 | 3/2003 | Brooks | |
| 2003/0186722 | A1 | 10/2003 | Weiner | |
| 2005/0015810 | A1 | 1/2005 | Gould et al. | |
| 2005/0021766 | A1* | 1/2005 | McKeowen et al. .......... 709/228 |
| 2005/0038880 | A1 | 2/2005 | Danforth | |
| 2005/0172161 | A1* | 8/2005 | Cruz et al. ......................... 714/4 |
| 2006/0020525 | A1* | 1/2006 | Borelli et al. .................... 705/34 |
| 2006/0130107 | A1 | 6/2006 | Gonder et al. | |
| 2006/0165086 | A1* | 7/2006 | Wilson et al. .............. 370/395.2 |
| 2007/0041327 | A1* | 2/2007 | Foster et al. ................... 370/242 |

(Continued)

FOREIGN PATENT DOCUMENTS
JP    2001-387616    4/2003

OTHER PUBLICATIONS

F5 Networks—Wikipedia, http://en.wikipedia.org/wiki/F5_Networks.

(Continued)

Primary Examiner — Joseph E Avellino
Assistant Examiner — Aftab Nasir Khan
(74) Attorney, Agent, or Firm — Otterstedt, Ellenbogen & Kammer, LLP

(57) ABSTRACT

A determination is made whether a first application server of a group of N application servers, N being at least two, is a coordinator of the group. Responsive to determining that the first application server is the coordinator of the group, a connection to a billing system is established, via a terminal server, by the first application server. A determination is made whether a second application server of the group of N application servers is the coordinator of the group. Responsive to determining that the second application server is not the coordinator of the group, a periodic check is made whether the second application server of the group of N application servers is the coordinator of the group. The second application server may later be determined to be the coordinator of the group, when the first server experiences difficulty. Once it is determined that the second application server now is the coordinator of the group, a connection is established to the billing system, via the terminal server, by the second application server.

17 Claims, 9 Drawing Sheets

U.S. PATENT DOCUMENTS

| | | | | |
|---|---|---|---|---|
| 2007/0217436 | A1* | 9/2007 | Markley et al. | 370/401 |
| 2008/0177998 | A1* | 7/2008 | Apsangi et al. | 713/155 |
| 2009/0019094 | A1* | 1/2009 | Lashley et al. | 707/203 |
| 2009/0063970 | A1* | 3/2009 | Steinmetz et al. | 715/706 |

OTHER PUBLICATIONS

Load balancing (computing)—Wikipedia, http://en.wikipedia.org/wiki/Load_balancing_(computing).

Round robin DNS—Wikipedia, http://en.wikipedia.org/wiki/Round_robin_DNS.

Internetworking Technology Handbook—Internet Protocol (IP) Multicast [Internetworking] —Cisco Systems, http://www.cisco.com/en/US/docs/internetworking/technology/handbook/IP-Multi.html.

* cited by examiner

SYSTEM AND METHOD FOR BILLING SYSTEM INTERFACE FAILOVER RESOLUTION

FIELD OF THE INVENTION

The present invention relates generally to communications systems and methods, and, more particularly, to broadband Internet access provided in association with video content networks and the like.

BACKGROUND OF THE INVENTION

Until recently, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber networks (HFNs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like.

One significant issue for a cable operator desiring to provide digital service is the configuration of its network. Designed for one-way delivery of broadcast signals, the existing cable network topology was optimized for downstream (toward the subscriber) only service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and will be referred to for the remainder of this application in capital letters, without the ® symbol, for convenience.

A DOCSIS compliant cable modem (DCCM) must be "provisioned" before the DCCM may be operated on the network. Provisioning involves a process by which a network device is initialized, authenticated, registered, and configured to operate with a cable network. A network device receives a boot file as part of the provisioning process. Access to the billing system is important when provisioning new cable modems or other devices, or adding new subscribers.

SUMMARY OF THE INVENTION

Principles of the present invention provide techniques for billing system interface failover resolution. In one aspect, an exemplary method (which can be computer-implemented) includes the steps of determining whether a first application server of a group of N application servers, N being at least two, is a coordinator of the group; and responsive to determining that the first application server is the coordinator of the group, establishing a connection to a billing system, via a terminal server, by the first application server. Further, the method includes determining whether a second application server of the group of N application servers is the coordinator of the group; and responsive to determining that the second application server is not the coordinator of the group, continuing to check whether the second application server of the group of N application servers is the coordinator of the group. Still further, the method includes determining that the second application server now is the coordinator of the group, responsive to the first server experiencing difficulty; and responsive to determining that the first application server now is the coordinator of the group, establishing a connection to the billing system, via the terminal server, by the second application server.

In another aspect, an exemplary system includes a broadband provisioning system, the broadband provisioning system in turn comprising a group of N operatively interconnected application servers, N being at least two. Also included are at least two billing systems; and at least two terminal servers, each of the billing systems having at least one of the terminal servers associated therewith and operatively coupled thereto, the terminal servers being selectively coupled to the N application servers. The N application servers are cooperatively configured to carry out one or more of the method steps described above.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

An exemplary embodiment of an apparatus or system, according to still another aspect of the invention, can include a memory and at least one processor coupled to the memory. The processor can be operative to facilitate performance of one or more of the method steps described herein. Non-limiting examples of processors are those in one or more servers described herein. In a further aspect, an apparatus or system can include means for performing the various method steps. The means can include one or more hardware modules, one or more software modules, or a mixture of one or more software modules and one or more hardware modules.

One or more method steps of the present invention can be implemented in the form of an article of manufacture including a machine readable medium that contains one or more programs which when executed implement such step(s).

Techniques of the present invention can provide substantial beneficial technical effects. For example, one or more embodiments may have one or more of the following advantages: more reliable and/or faster provisioning.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
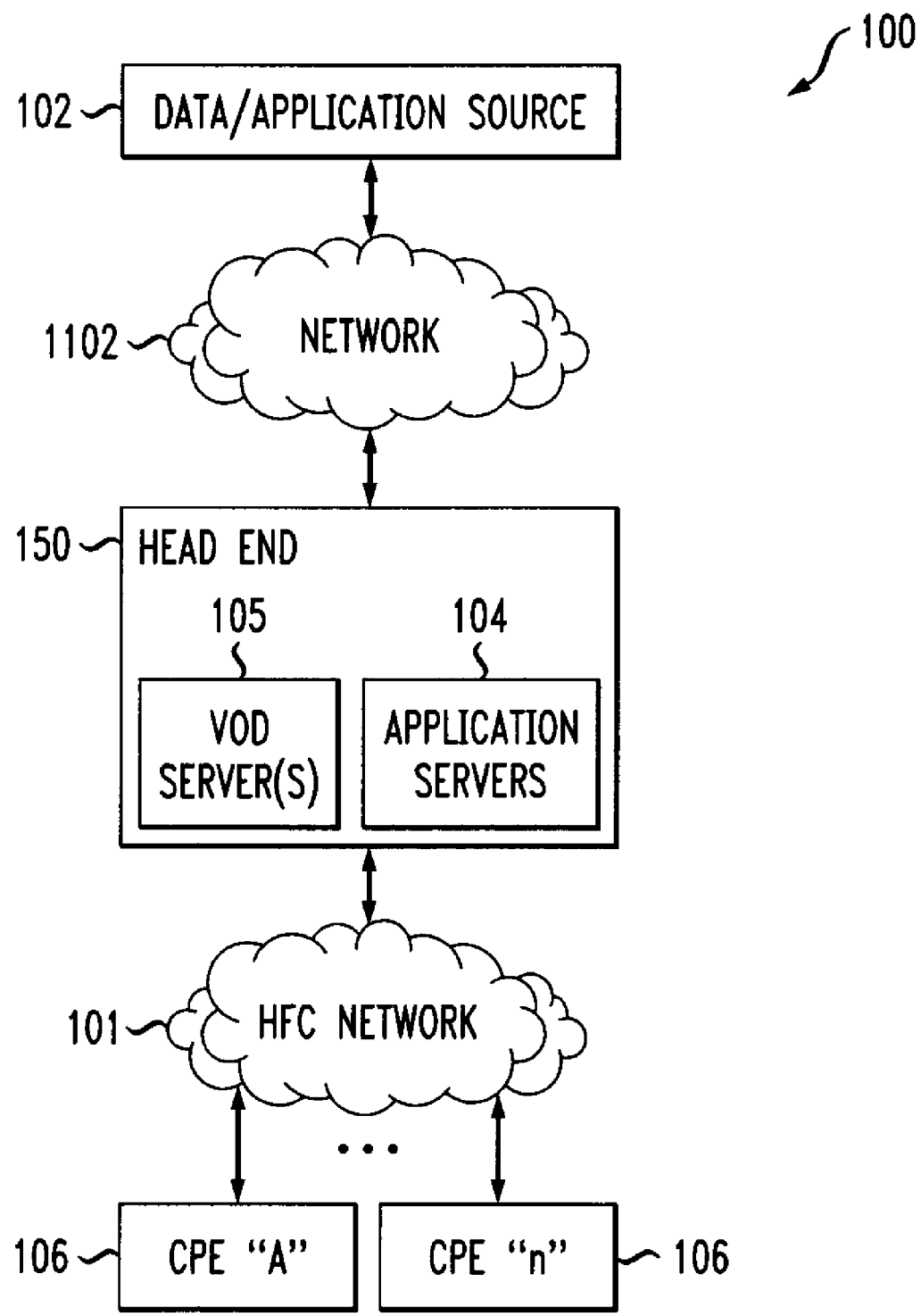
FIG. 1 is a functional block diagram illustrating an exemplary hybrid fiber-coaxial (HFC) network configuration, useful with one or more embodiments of the present invention.

FIG. 1 illustrates a typical content-based network configuration with which techniques of the present invention may be used. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head end 150. A simple architecture is shown in FIG. 1 for illustrative brevity, although it will be recognized that comparable architectures with multiple origination points, distribution servers, VOD servers, and/or CPE devices (as well as different network topologies) may be utilized consistent with the invention. For example, the head-end architecture of FIG. 2 (described in greater detail below) may be used.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 2). Non-limiting examples of CPE are set-top boxes and high-speed cable modems.

Figure 2:
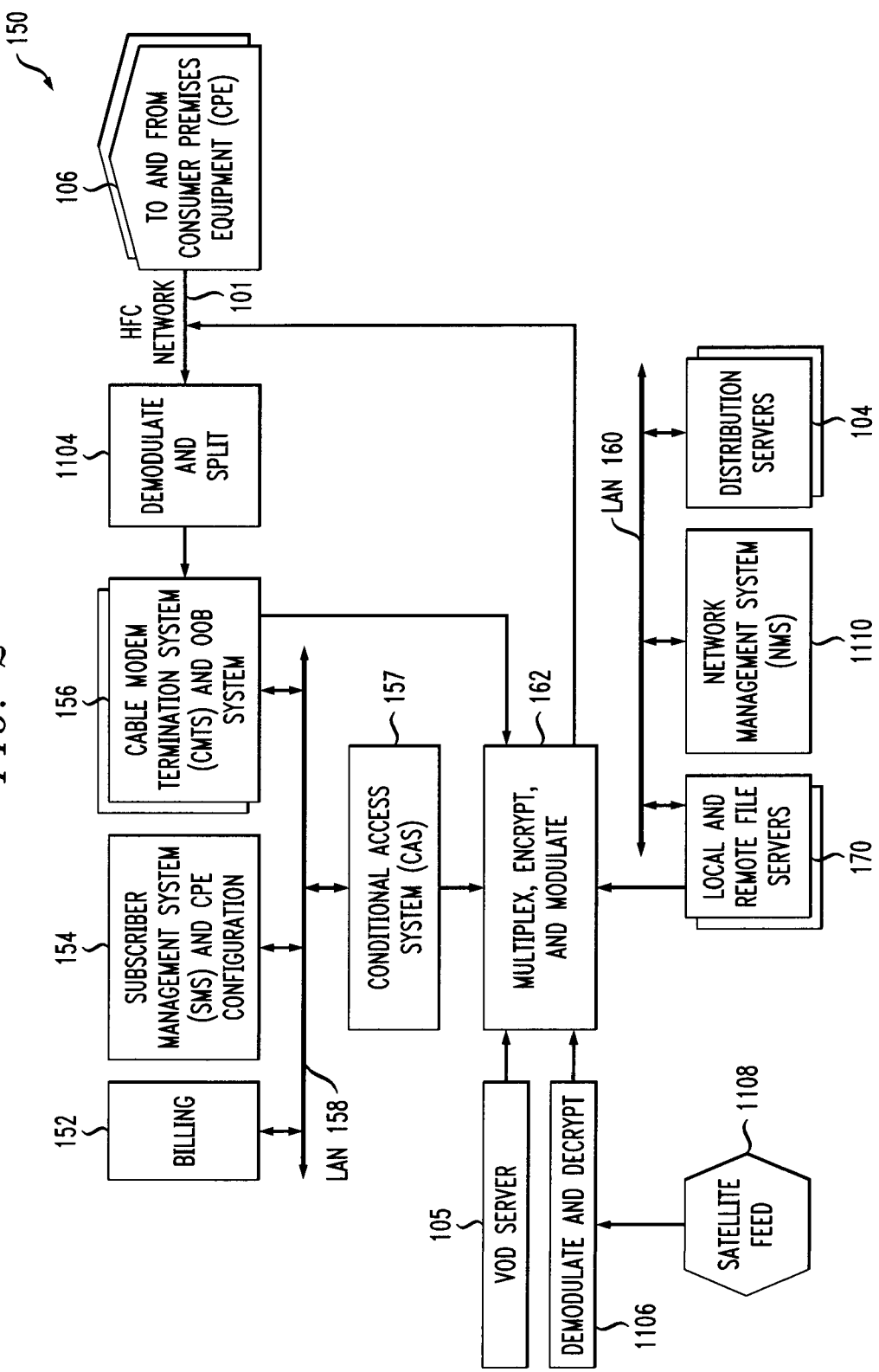
FIG. 2 is a functional block diagram illustrating one exemplary HFC cable network head-end configuration, useful with one or more embodiments of the present invention.

Referring now to FIG. 2, one exemplary head-end architecture useful with the present invention is described. As shown in FIG. 2, the head-end architecture 150 comprises typical head-end components and services including billing module 152, subscriber management system (SMS) and CPE configuration management module 154, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 2 is high-level, conceptual architecture and that each multi-service operator (MSO) may have multiple head-ends deployed using custom architectures.

The architecture 150 of FIG. 2 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as, for example, where the VOD servers are associated with a core switching device such as an 802.3z Gigabit Ethernet device). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 3) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or aforementioned DOCSIS channels and associated protocols. The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Figure 3:
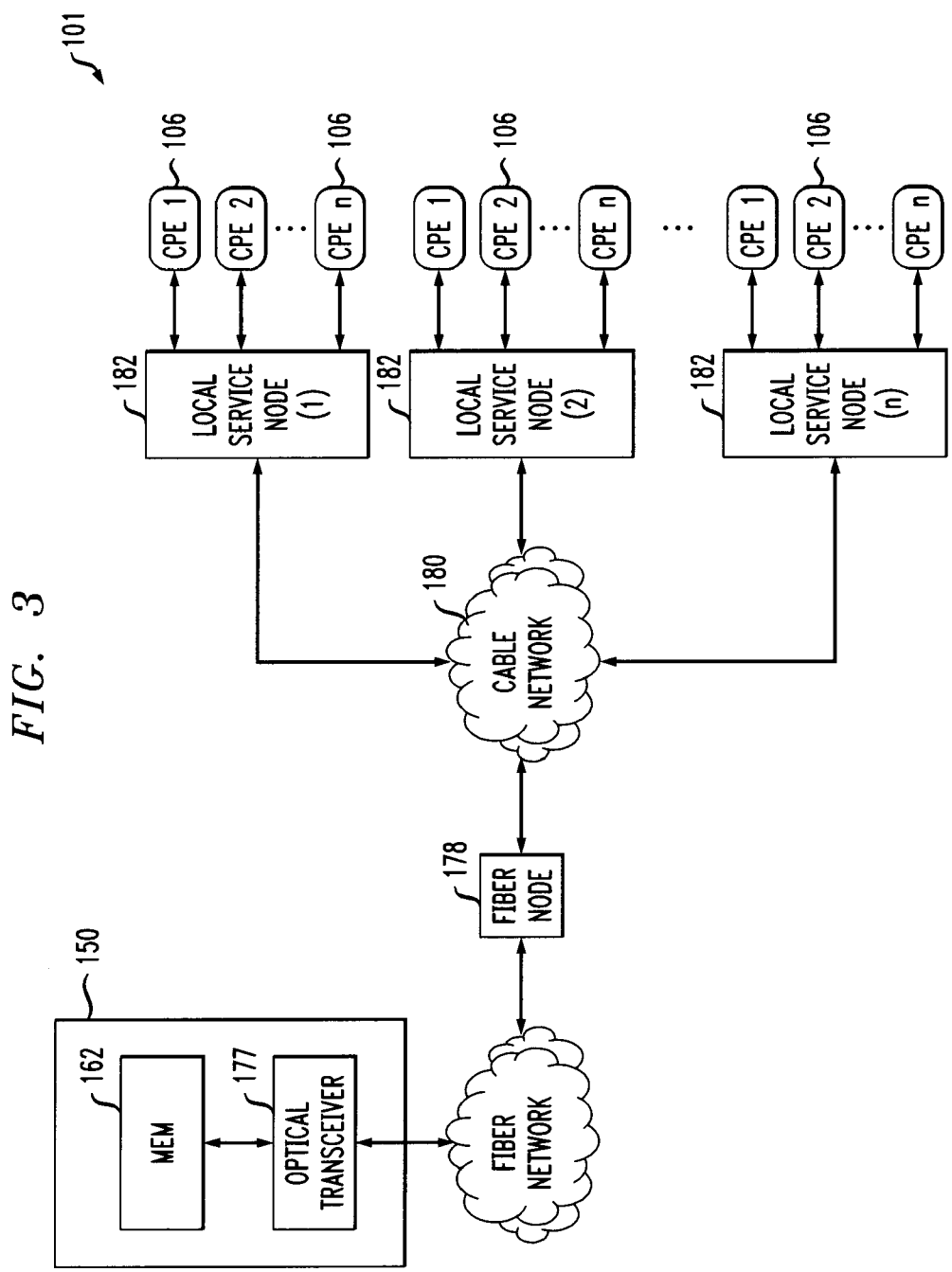
FIG. 3 is a functional block diagram illustrating one exemplary local service node configuration useful with one or more embodiments of the present invention.

As shown in FIG. 3, the network 101 of FIGS. 1 and 2 comprises a fiber/coax arrangement wherein the output of the MEM 162 of FIG. 2 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes.

Figure 4:
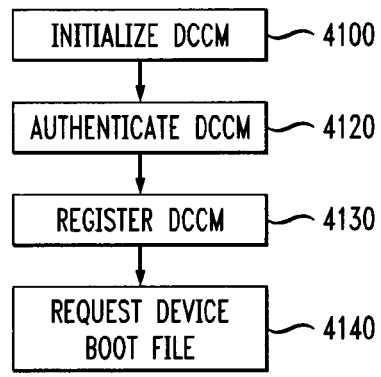
FIG. 4 illustrates the provisioning of a DOCSIS-compliant cable modem, which may require reliable access to an exemplary billing system in accordance with one or more embodiments of the invention.

Referring to FIG. 4, the provisioning of a DOCSIS-compliant cable modem (DCCM) with a boot file is illustrated. Each time a DCCM is powered-on or reset, it must be initialized 4100 through a series of "handshakes" and transfers of data between itself and a cable modem termination system (CMTS) 156 at the cable head end 150. During this process, the DCCM receives channel and synchronization ("sync") information to allow it to establish communications with the CMTS 156. It also receives a temporary service identification (SID) number. The modem power is set and the CMTS 156 and the DCCM are now "known" to each other and able to communicate. It will be appreciated that the DCCM is one example of CPE 106. Further details regarding the provisioning process are available in US Patent Publication Numbers 2005/0015810 of Gould et al., entitled "System and method for managing provisioning parameters in a cable network," and 2005/0038880 of Danforth, entitled, "System and method for provisioning a provisionable network device with a dynamically generated boot file using a server," the complete disclosures of both of which are expressly incorporated herein by reference in their entireties for all purposes.

Following initialization, the DCCM is then authenticated 4120 to confirm that the DCCM is entitled to receive service. In one or more instances, prior to obtaining service, the customer will place a call to a customer service representative, who will obtain the device details from the customer and feed same to the billing system, which sends same to the provisioning system. Prior to the DCCM request to initialize, Provisioning application servers (such as 604, 605, 704, 705, 706, 804, 805, 806 discussed below) will receive the request from billing systems and will add services that the DCCM is authorized to use (for example, the number of IP addresses and bandwidth, and so on). Therefore, without reliable provisioning, the DCCM will not receive the services it is authorized to use. The next provisioning step is registration 4130, where the DCCM is configured as an Internet device. During this process, the DCCM synchronizes its clock with that of the CMTS 156 and obtains an Internet protocol (IP) address from a Dynamic Host Configuration Protocol (DHCP) server in head end 150 (for example, on LAN 158). DHCP servers help the DCCM to receive the authorized services. The DHCP server also provides the DCCM the network address of a Trivial File Transfer Protocol (TFTP) server in head end 150, and a location where a device configuration file (or "boot file") for that modem can be found and downloaded. The TFTP Servers are in Head End 150 (for example, on LAN 158) and help the DCCM to receive the authorized services. The DCCM requests its device boot file 4140 by then sending the TFTP a request message comprising a device boot file filename. Upon receipt of the device boot file, the DCCM sends a registration request (REG-REQ) to the CMTS. This REG-REQ includes the current service identification (SID), IP address, operational attributes, upstream and downstream channel IDs, time stamps, and other configuration settings, as well as a message integrity check (MIC) value. If the information is accepted, the CMTS 156 responds with a new SID and completes the registration process.

In one or more instances, the CMTS is not configured with the attributes of its DCCMs. Rather, the CMTS will acquire these attributes and the attribute values through the registration request message.

In a DOCSIS environment, the device boot file comprises device attributes that are expressed in type-length-value (TLV) format and information necessary for the DCCM to operate on the cable network to which it is connected. By way of illustration, attributes identified by the DOCSIS standard for a DCCM include the maximum upstream and downstream data rates (based on the service level to which the customer has subscribed), the number of devices supported by the DCCM that require IP addresses, and information necessary to identify and authenticate the DCCM to the cable network. The device boot file is received by the DCCM in binary format. The DCCM uses the device boot file to populate device attributes with specific values.

In one or more non-limiting embodiments, techniques of the invention can be implemented in connection with a remotely manageable premises device that, inter alia, acts as a centralized client networking platform providing gateway services such as network management as well as traditional content and high-speed data delivery functions. Such a device is disclosed in the aforementioned US Patent Publication 2007/0217436 of Markley et al. The premises device of Markley et al. may be used, for example, in a home or residential environment, enterprise or corporate environment, military or government environment, or combinations of the foregoing, and may include, for example, a DCCM. The device also acts as the shared internet (e.g., a world-wide series of interconnected computer networks using internet protocol, commonly referred to as the Internet) connection for all devices in the premises via a cable modem or other such interface, sharing personal and DVR content such as video, music and photos (and any associated metadata) throughout the premises, and providing both a wired and wireless network in the home. Telephony services utilizing e.g., embedded multimedia terminal adapter (eMTA) and/or Wi-Fi architectures may also be provided via the device; these services can make use of the network operator's indigenous voice over Internet protocol (VoIP) or comparable telephony capability if desired, thereby providing an even more unified service environment.

In another aspect, the network 101 may be a switched digital network, as known, for example, from US Patent Publication 2003/0056217 of Paul D. Brooks, entitled "Technique for Effectively Providing Program Material in a Cable Television System," the complete disclosure of which is expressly incorporated herein by reference in its entirety for all purposes. The Brooks publication describes one exemplary broadcast switched digital architecture useful with one or more embodiments of the present invention, although it will be recognized by those of ordinary skill that other approaches and architectures may be substituted.

In addition to "broadcast" content (e.g., video programming), the systems of FIGS. 1-3 also deliver Internet data services using the Internet protocol (IP), although other protocols and transport mechanisms of the type well known in the digital communication art may be substituted. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that one or more embodiments of the invention may be useful for providing billing system redundancy in a cable television system, or other video content network, providing broadband Internet access. The aforementioned descriptions of networks and provisioning techniques are intended to be exemplary and non-limiting.

Figure 5:
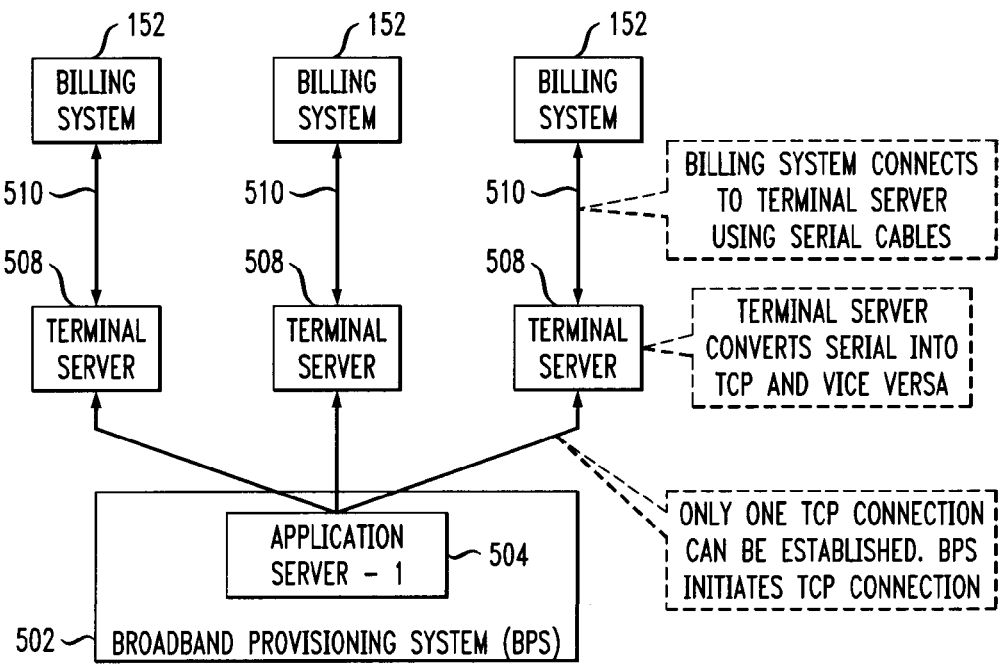
FIG. 5 shows billing system access from a broadband provisioning system, in accordance with the prior art.

As noted, aspects of the invention address billing for high-speed Internet service over a video content network, such as a cable television (CATV) system. A functional link to billing system 152 is important when provisioning, to deal with requests for adding new devices and/or subscribers. With reference now to FIG. 5, heretofore, billing system interconnection has been carried out using a Serial/TCP approach with a single application server. In particular, prior art system 500 includes a broadband provisioning system (BPS) 502—BPS 502 may have multiple application server's, but only one of them, server 504, is designated to make the connection to the billing system(s). Billing systems 152 may be different instances of the same type of billing system, and may be located, for example, in different head ends 150. BPS 502 may be located in a head end 150, and each terminal server 508 may be located in the same head end 150 as the corresponding billing system 152. In the prior art system of FIG. 5, there can be many application servers 504 in the BPS (although only one is shown), but only one can connect to the billing system(s) at one time, and a manual re-connection is needed in case of failure. Note that application server 104 discussed above is illustrative of many different kinds of application servers, including servers 504, 604, 605, 704, 705, 706, 804, 805, 806, DHCP, TFTP, and so on.

In current systems, only a single application server 504 makes the connection to the billing system(s). The connection to the billing system(s) is usually made through another component, called the terminal server 508. Terminal server(s) 508 convert the TCP connection with the application server 504 to the serial connection(s) with the billing system(s) and vice-versa. A serial cable 510 runs from each terminal server 508 to the corresponding billing system. The nature of serial cable(s) 510 is one-to-one, such that only one client, namely, the application server 504, can make a connection to one serial cable through a terminal server 508. Thus, while it is possible to have multiple terminal servers 508, and application server 504 can connect to multiple terminal servers 508, the terminal server(s) 508 have virtual transmission control protocol/internet protocol (TCP/IP) posts which map one-to-one with the serial cables 510. On each virtual post, only one connection can be made—this is acceptable as long as there is only one application server 504 which is making the connection, since only the single application server 504 can make a connection to the post on the given terminal server 508.

According to one or more embodiments of the invention, at least one additional application server is employed. Since only one application server can make an outbound connection at a time, the two (or more) application servers communicate with each other to ensure that only one application server at a time makes the connection. The additional application server(s) allow for failover—to ensure that the link to the billing system(s) is up and available for provisioning and the like, two or more application servers are employed—for example, one primary server and one secondary server. When the primary server goes down, the billing link is kept up. In one or more embodiments, multicast messages are sent from one application server to the other application server. When the primary server goes down, the secondary server picks up and reestablishes the connection to the billing system(s), and processing of the request to access the billing system(s) can resume.

Figure 6:
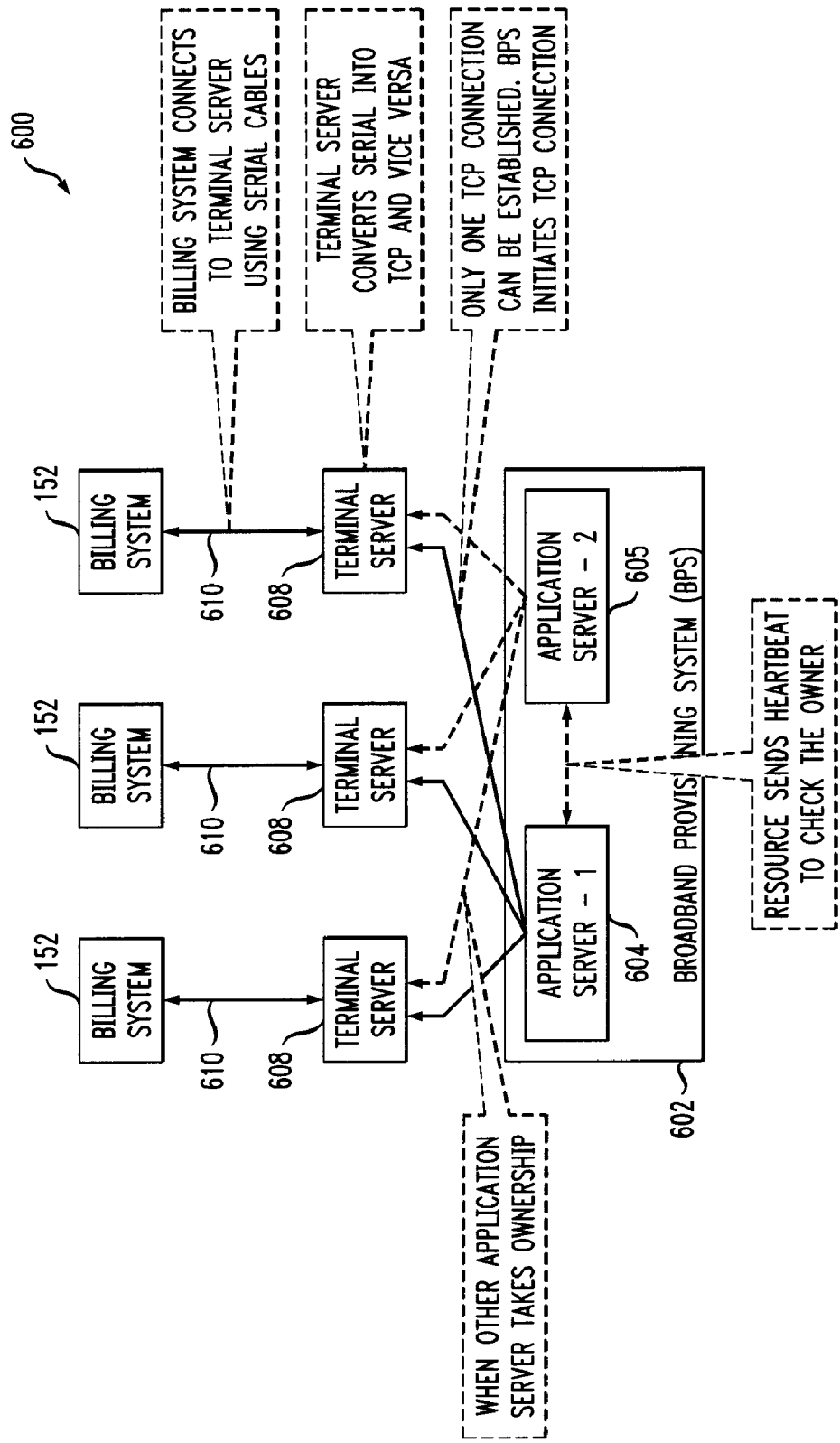
FIG. 6 shows exemplary billing system access from a broadband provisioning system, in accordance with an aspect of the invention.

With attention now to FIG. 6, which depicts a non-limiting exemplary embodiment of billing system failover 600, according to an aspect of the invention, one or more additional application servers are added. This approach can be advantageous, for example, for disaster recovery and failover (by way of example and not limitation, in some instances, there may be a goal of having the billing system "up" 99.99% of the time). Elements in FIG. 6 similar to those in FIG. 5 have received the same reference character incremented by one hundred. Thus, there are two servers 604, 605, but only one TCP connection can be established between the application servers 604, 605, and a given terminal server 608. By adding another application server 605, if something goes wrong when first application server 604 tries to make an outbound connection to the terminal server 608, the second application server 605 takes over the connection without any manual intervention. Accordingly, in one or more embodiments of the invention, a software component which initiates the application-server-to-terminal-server TCP connection is present on both application servers 604, 605, but only runs on one server at a time, with failover to another server if the first server "dies" or the connection is terminated. However, application servers 604, 605 send a "heartbeat" to each other using multicast technology—they decide, based on the "heartbeat," which of the servers 604, 605 will be the primary owner (also referred to herein as the "coordinator") for the resource (that is, the outgoing connection to the terminal server(s)).

In a non-limiting example, each billing system 152 in FIG. 6 may be in a different head end 150, and each terminal server 608 may be in the same head end as the billing system it is connected to. Each billing system can have more than one terminal server, if desired (only a single terminal server is shown associated with each billing system 152 in FIG. 6, for purposes of illustrative clarity). Broadband provisioning system 602 with application servers 604, 605 may be located in a regional data center and may connect to all the head ends which are being serviced by the particular system 602, or may be located in a particular head end 150, with interconnections to the terminal servers and billing systems in other head ends 150. Regional data centers maintained by MSOs are known to the skilled artisan, who can modify same to practice one or more embodiments of the invention, based on the teachings herein.

As a given application server 604, 605 comes on line, it runs the aforementioned component, which sends the heartbeat over the network, as indicated by the dotted line between servers 604, 605, to see if there is currently an owner of the resource. If the given application server 604, 605 does not get a reply, it takes ownership of that resource. When it takes ownership, it initiates connection to the terminal server 608. After some time, the other one of the application servers 604, 605 comes on line and runs the component to initiate the connection to the terminal server 608; however, before initiating the connection, it sends a message on the network, through multicasting, to see if there is a coordinator for the resource. In this case, if the first server (say, 604) is still up and running, the second server (say, 605) will receive a reply, indicating that the first server 604 is acting as the coordinator, in which case second application server 605 "keeps quiet." The heartbeat process preferably continues at predefined intervals of time. The solid arrows emanating from server 604 to terminal servers 608 exemplify this first state of affairs.

Consider now the case when the first server 604 crashes. Its component loses the connection to the terminal server(s) 608. On the next heartbeat, there is no reply, so second server 605 takes ownership and sends an update over the network (that is, the TCP/IP network coupling the application servers). The dotted arrows emanating from server 605 to terminal servers 608 exemplify this second state of affairs. When the "bad" server 604 is fixed, it comes back on line, and the aforementioned component residing on server 604 sends a heartbeat and sees that the second server 605 now has ownership.

Figure 7:
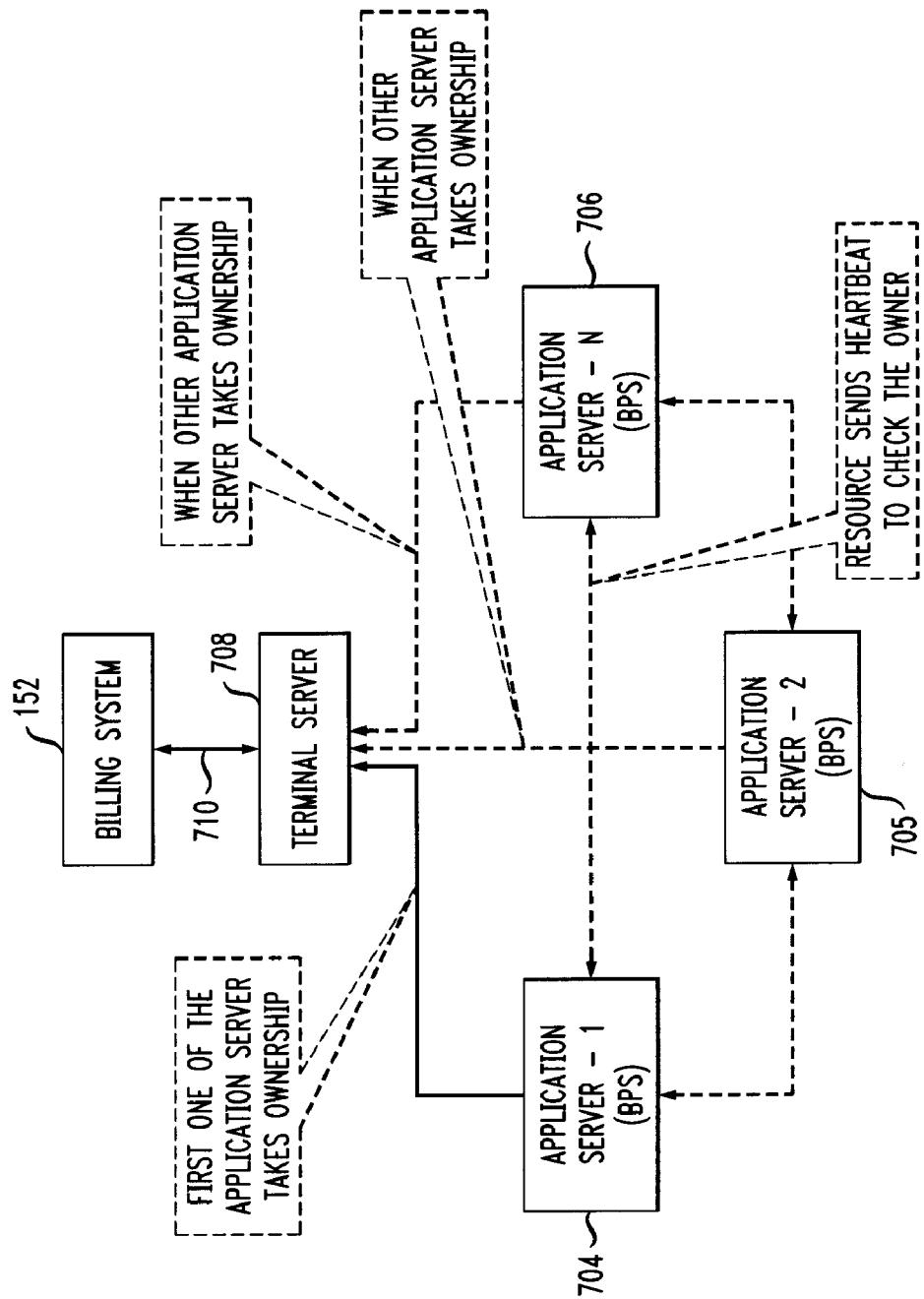
FIG. 7 shows exemplary extension of the techniques shown in FIG. 6 to an arbitrary number of application servers, in accordance with another aspect of the invention.

The process just described with regard to FIG. 6 can be flexibly extended to any number of servers, N, as seen in FIG. 7, without the need to make core changes to the TCP/IP network coupling the application servers. All that is needed to keep adding additional application servers, up to an "Nth" application server 706, is to add the servers and keep running the aforementioned component on all the servers. Elements in FIG. 7 similar to those in FIG. 6 have received the same reference character incremented by one hundred. A different instance of the aforementioned component preferably runs on each one of the servers 704, 705, . . . (Nth server) 706.

Figure 8:
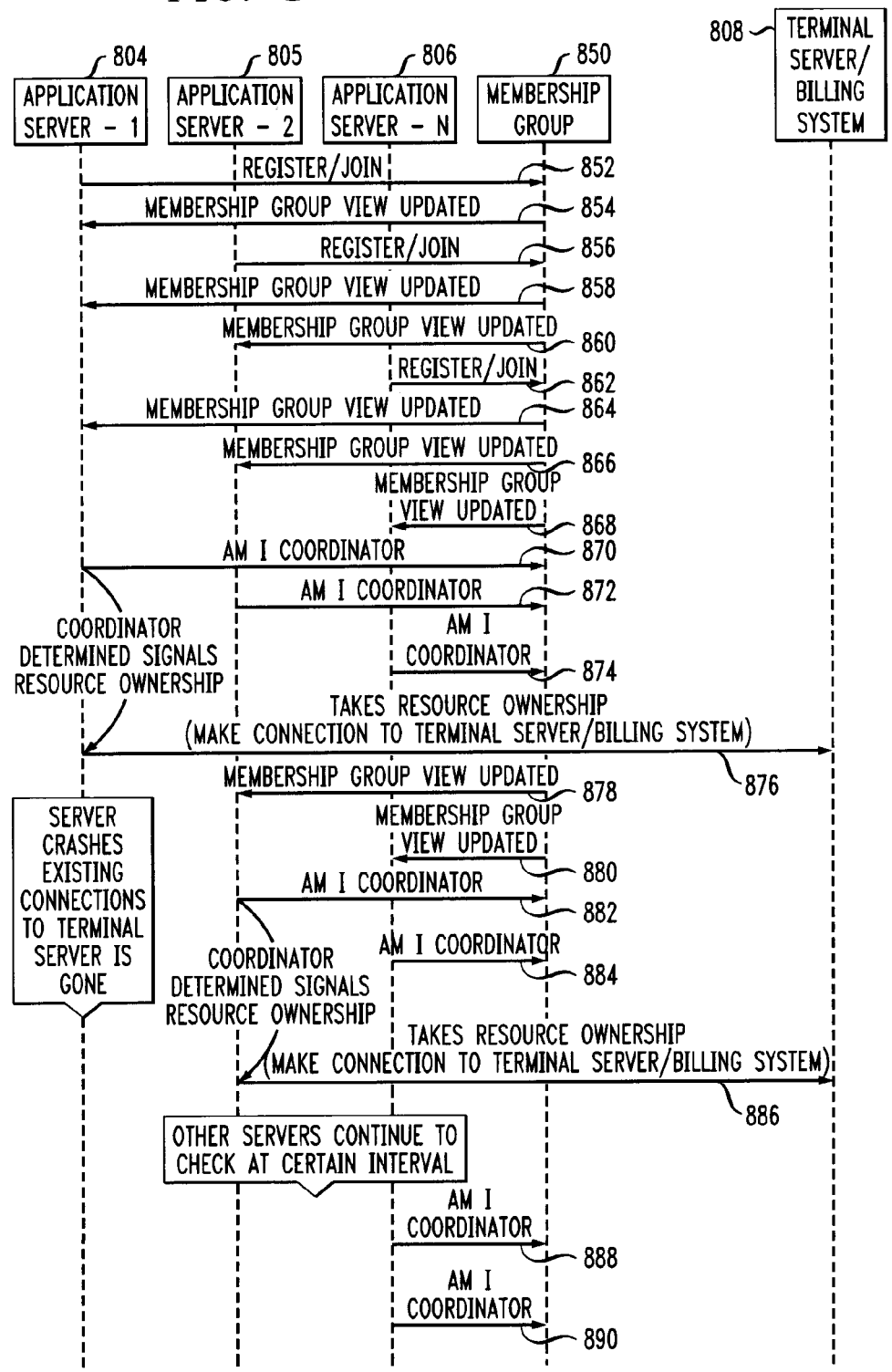
FIG. 8 shows exemplary message flow, according to still another aspect of the invention.

FIG. 8 depicts an exemplary sequence of actions which happen when the servers come online, in the case of multiple servers in a virtual membership group. Elements in FIG. 8 similar to those in FIG. 7 have received the same reference character incremented by one hundred. Block 808 represents the terminal server(s) and billing system(s). Whenever an application server 804, 805, 806 comes online, it executes the aforementioned component to try and make a connection to the terminal server 808. Furthermore, when coming on line for the first time, the server 804, 805, or 806 sends a registration to join the membership group 850. There may be port numbers (such as "2001," "2002") on the terminal server 808. Using those two port numbers, the system defines a membership group 850, which should be unique so as to function properly in the multicast environment. If not unique, other application servers could also make a connection to the terminal server 808—thus, with regard to this unique membership group 850, whenever the first application server 804 tries to create a connection, it registers the unique membership group—when the other application servers 805, 806 come on line, they do not register a unique membership group, they join the existing membership group. However, if any particular server 804, 805, 806 is the first to come on line, such that membership group 850 does not exist yet, the particular server coming on line for the first time creates (registers) group 850.

Every time an application server 804, 805, 806 registers a new group of joins an existing group, the membership group view (which lists the unique identifier (ID) for each and every application server 804, 805, 806 in that membership group) is updated. Every time another application server 804, 805, 806 joins, the update has to be sent to more application servers 804, 805, 806.

The techniques just described will be appreciated by continued reference to FIG. 8. At 852, server 804 registers a new group 850. At 852, the group view is updated to reflect server 804 registering the new group. At 856, server 805 joins the existing group, while at 858 and 860, the group view is updated to reflect server 805 joining the existing group (two messages this time because there are two group members). At 862, server 806 joins the existing group, while at 864, 866, and 868, the group view is updated to reflect server 806 joining the existing group (three messages this time because there are three group members).

As seen at 870, 872, 874, the servers 804, 805, 806, respectively, start "asking" whether they are the coordinator for the membership group 850. If there is no coordinator, the first server to send the request, in this case, server 805 will "anoint" itself as the coordinator that owns the resource (that is, the connection to the terminal server 808), and that application server (in this case, server 804) will take resource ownership and make the connection to the terminal server 808 (and thus to the billing system), as seen at 876.

With continued reference to FIG. 8, consider now the case where the application server that is the coordinator, in this case, server 804, experiences a crash. As shown at 878, 880, the membership group view is updated to the remaining servers 805, 806 respectively, to indicate that application server 804 is "dead." The remaining application servers 805, 806, at defined intervals of time, ask if they are the coordinator, as shown at 882, 884 respectively, and the first one to ask, in this case, server 805, takes ownership, as shown at 886. The other server(s), in this case, server 806, continue to check at regular intervals, as shown at 888, 890.

To implement the just-described functionality, one or more embodiments of the invention employ multicast technology, that is, the broadcasting of TCP/IP packets on the network connecting the application servers, such as 804, 805, 806 (the network is suggested by the dotted lines connecting servers 604, 605 in FIG. 6 and 704, 705, 706 in FIG. 7). User datagram protocol (UDP) can be used to broadcast the packets. The packet headers define a multicast subnet on the network, to implement the membership group 850. A message for the group 850 will be sent to all the application servers on the multicast subnet. When registering for the membership group 850, the identity can be defined as a multicast subnet; in this subnet, any application server that joins gets a unique identifier (Group ID), and it is a member of the multi-member membership group 850 (multicast subnet). The functionality on block 850 may be carried out, for example, by a software module, using multicast technology, running on each application server 804, 805, and 806.

Figure 9:
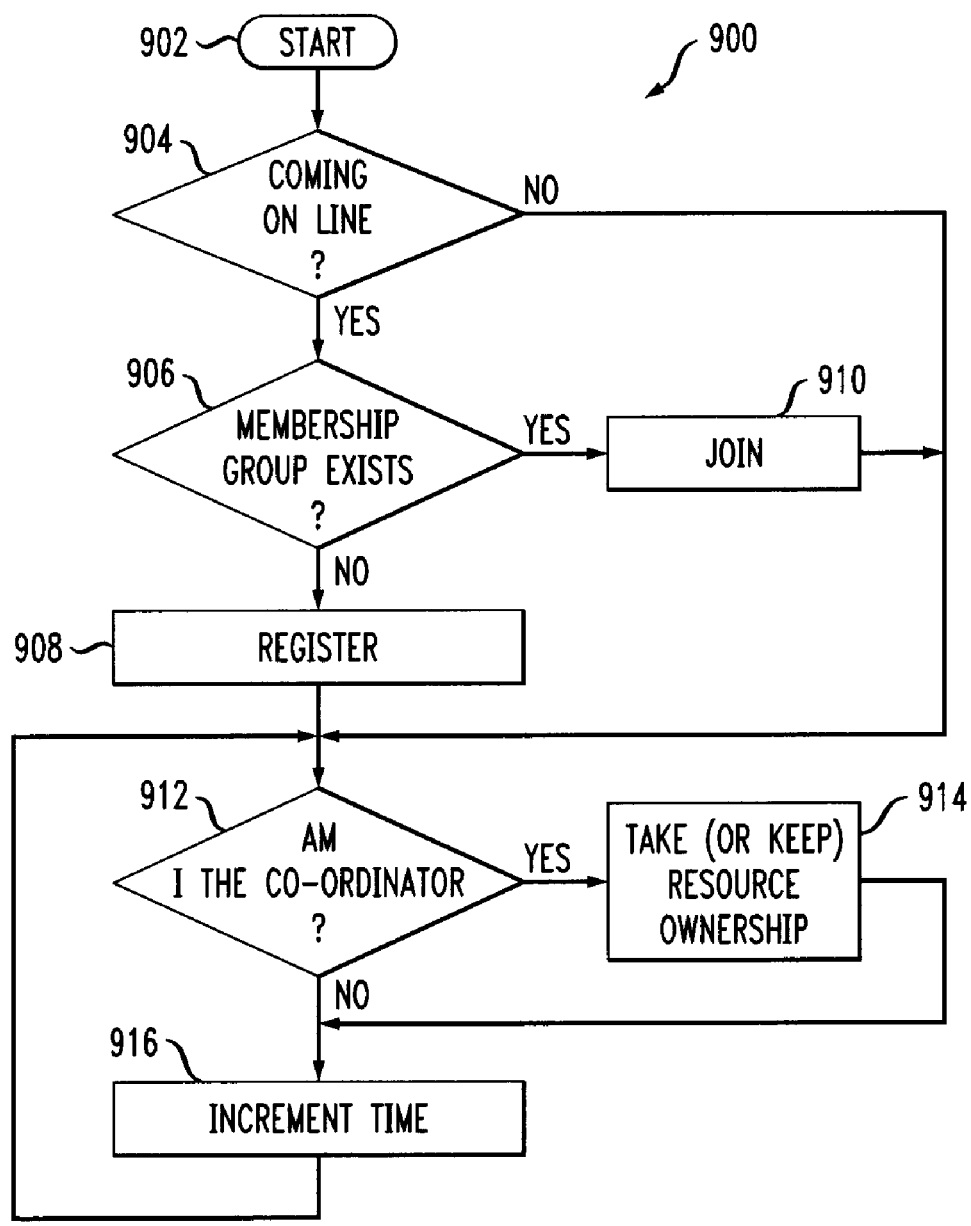
FIG. 9 is a flow chart of exemplary steps that can be carried out by a software component running on each redundant application server, for billing failover, according to a further aspect of the invention.

FIG. 9 shows a flow chart 900 of exemplary functionality of the aforementioned software component. After beginning at block 902, the component determines in block 904 whether the application server on which it is running is coming on line. If yes, the component determines whether a membership group exists, at block 906. If no, a group is registered, at block 908, while if yes, the existing group is joined at block 910. Flow continues to block 912 (which is also reached by the "NO" branch of block 904).

In block 912, the component determines whether the application server on which it is running is the coordinator. If yes, resource ownership is assumed by that application server at block 914. If no, the time is incremented at block 916 and the component continued to periodically check whether the application server on which it is running is the coordinator. Note that even if a particular server is currently the coordinator, it still continues to send out a heartbeat after block 914.

By way of review and provision of further detail, activation of a high-speed cable modem may occur via billing system 152, which sends an order to an application server 604, 605, 704, 705, 706, 804, 805, 806, via a terminal server 608, 708, 808. Application server 604, 605, 704, 705, 706, 804, 805, 806 creates a configuration file name, which is added to a directory server, after which the BPS 602 need not play any additional role. At this point, a technician may go to a customer's premises, plug in a cable modem, which comes on line, and asks for an IP address, which it receives from a dynamic TFTP server, which in turn communicates with the directory server to obtain the just-created configuration file name. The name of this file is sent to the cable modem, which downloads the file from the dynamic TFTP server, and the cable modem then comes on line.

In another aspect, consider a case where a cable modem has been successfully provisioned and has been running for some time, but a malfunction occurs. A technician may visit the premises, and decide to install a new device. To do this, the technician phones the billing system customer service representative, who sends a new device connection from the billing system to an application server 604, 605, 704, 705, 706, 804, 805, 806. In still another aspect consider a case where a customer needs to know his or her password to access e-mail or the like. He or she can call the billing system customer service representative, who sends a connection to an application server 604, 605, 704, 705, 706, 804, 805, 806 to reset his or her password.

By way of review, in current techniques, if a first application server is making a connection to a terminal server, and through the terminal server to a billing system, and that system "dies," there is no way to make a connection from a second application server, except for someone to manually restart the same component on the second application server—no failover is available. In one or more embodiments of the invention, automatic failover is provided so that a connection is automatically made via the second application server. Faster speed is obtained in one or more embodiments of the invention, as well, since in the old approach without failover, messages queue up and delay is caused.

Another aspect of the invention is a system including a broadband provisioning system, such as 602, with a group of N operatively interconnected application servers, such as 604, 605, 704, 705, 706, 804, 805, 806, N being at least two, as well as at least two billing systems 152. The system also includes at least two terminal servers, 608, 708, 808, each of the billing systems 152 having at least one of the terminal servers associated therewith and operatively coupled thereto. The terminal servers are selectively coupled to the N application servers, and the N application servers are cooperatively configured to carry out one or more of the method steps described herein. Another aspect of the invention is a single one of the application servers 604, 605, 704, 705, 706, 804, 805, 806, configured to operate as described herein. Still another aspect is a system including means for carrying out one or more of the method steps described herein.

Figure 10:
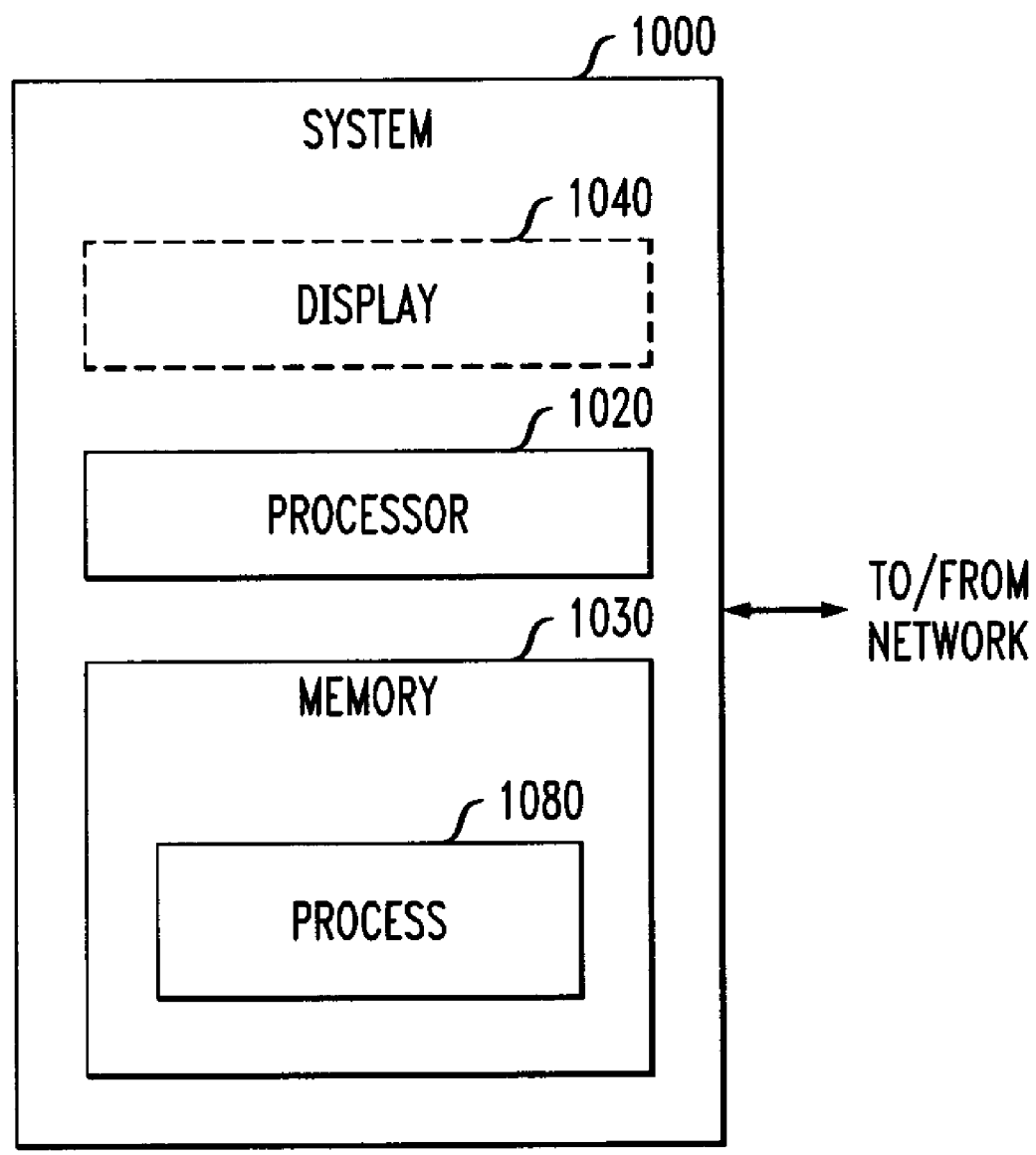
FIG. 10 is a block diagram of a computer system useful in connection with one or more aspects of the invention.

The invention can employ hardware and/or software aspects. Software includes but is not limited to firmware, resident software, microcode, etc. An exemplary embodiment of an inventive apparatus can include a memory and at least one processor coupled to the memory. The processor can be operative to facilitate performance of one or more of the method steps described herein. In another aspect, the apparatus can include means for performing the various method steps. The means can include one or more hardware modules, one or more software modules, or a mixture of one or more software modules and one or more hardware modules (appropriate interconnections via bus, network, and the like can also be included). One or more method steps of the present invention can be implemented in the form of an article of manufacture including a machine readable medium that contains one or more programs that when executed implement such step or steps. FIG. 10 is a block diagram of a system 1000 that can implement part or all of one or more aspects or processes of the present invention, processor 1020 of which is representative of processors (such as those in elements or blocks 102, 104, 105, 106, 150, 170, 504, 508, 604, 605, 608, 704, 705, 706, 804, 805, 806, and elsewhere) depicted in the other figures. In one or more embodiments, inventive steps are carried out by one or more of the processors in conjunction with one or more interconnecting network(s). As shown in FIG. 10, memory 1030 configures the processor 1020 to implement one or more aspects of the methods, steps, and functions disclosed herein (collectively, shown as process 1080 in FIG. 10). The memory 1030 could be distributed or local and the processor 1020 could be distributed or singular. The memory 1030 could be implemented as an electrical, magnetic or optical memory, or any combination of these or other types of storage devices. It should be noted that if distributed processors are employed, each distributed processor that makes up processor 1020 generally contains its own addressable memory space. It should also be noted that some or all of computer system 1000 can be incorporated into an application-specific or general-use integrated circuit. For example, one or more method steps could be implemented in hardware in an ASIC rather than using firmware. Display 1040 is representative of a variety of possible input/output devices.

System and Article of Manufacture Details

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

Accordingly, it will be appreciated that one or more embodiments of the present invention can include a computer program including computer program code means adapted to perform one or all of the steps of any methods or claims set forth herein when such program is run on a computer, and that such program may be embodied on a computer readable medium. Further, one or more embodiments of the present invention can include a computer including code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   determining whether a first application server of a group of N application servers having only a single coordinator, N being at least two, is said coordinator of said group, each of said N application servers having an instance of a software component thereon;
   responsive to determining that said first application server is said coordinator of said group, establishing a connection between said first application server and a billing system, via:
     a transfer control protocol connection between said first application server and a terminal server, and
     a serial cable between said terminal server and said billing system, such that only a single one of said N application servers can connect to said billing system at any given time, said connection between said first application server and said terminal server including an instance of said software component residing on said first application server running on a processor of said first application server to initiate said transfer control protocol connection between said first application server and said terminal server, those of said N application servers other than said first application server not running, except for a heartbeat function, while said first application server is said coordinator of said group;
   determining whether a second application server of said group of N application servers is said coordinator of said group;
   responsive to determining that said second application server is not said coordinator of said group, continuing to check whether said second application server of said group of N application servers is said coordinator of said group;
   responsive to said first application server experiencing difficulty, determining that said second application server now is said coordinator of said group; and
   responsive to determining that said second application server now is said coordinator of said group, establishing a connection between said second application server and said billing system, via:
     a transfer control protocol connection between said second application server and said terminal server, and
     said serial cable between said terminal server and said billing system, said connection between said second application server and said terminal server including an instance of said software component residing on said second application server running on a processor of said second application server to initiate said transfer control protocol connection between said second application server and said terminal server, those of said N application servers other than said second application server not running, except for said heartbeat function, while said second application server is said coordinator of said group;
   wherein said determining steps are carried out by said heartbeat function sending multicast heartbeats over a transmission control protocol/internet protocol network connecting said N application servers.

2. The method of claim 1, wherein said determining that said first application server is said coordinator of said group comprises said first application server being a first one of said N application servers to ask whether it is said coordinator of said group.

3. The method of claim 2, wherein said heartbeats are sent out by said instances of said software component.

4. The method of claim 2, wherein said steps are carried out within a broadband provisioning system of a broadband communications system.

5. The method of claim 4, further comprising said first application server continuing to determine whether said first application server is said coordinator even while said connection to said billing system is established by said first application server.

6. A system comprising:
   a broadband provisioning system, said broadband provisioning system in turn comprising a group of N operatively interconnected application servers having only a single coordinator, N being at least two, each of said N application servers having an instance of a software component thereon;
   at least two billing systems;
   at least two terminal servers, each of said billing systems having at least one of said terminal servers associated therewith and operatively coupled thereto via a corresponding one of at least two serial cables, said terminal servers being selectively coupled to said N application servers;
   wherein said N application servers are cooperatively configured to:
   determine whether a first of said application servers is said coordinator of said group;
   responsive to determining that said first application server is said coordinator of said group, establish a connection between said first application server and a given one of said billing systems, via:
     a transfer control protocol connection between said first application server and a corresponding one of said terminal servers, and
     said corresponding one of said at least two serial cables, such that only a single one of said N application servers can connect to said given one of said billing systems at any given time, said connection between said first application server and said corresponding one of said terminal servers including a corresponding one of said instances of said software component, residing on said first application server, running on said first application server to initiate said transfer control protocol connection between said first application server and said corresponding one of said terminal servers, those of said N application servers other than said first application server not running, except for a heartbeat function, while said first application server is said coordinator of said group;
   determine whether a second application server of said group of N application servers is said coordinator of said group:
   responsive to determining that said second application server is not said coordinator of said group, continue to check whether said second application server of said group of N application servers is said coordinator of said group;

responsive to said first application server experiencing difficulty, determine that said second application server now is said coordinator of said group; and responsive to determining that said second application server now is said coordinator of said group, establish a connection between said second application server and said given one of said billing systems, via:

a transfer control protocol connection between said second application server and said corresponding one of said terminal servers, and said corresponding one of said at least two serial cables, said connection between said second application server and said corresponding one of said terminal servers including a corresponding one of said instances of said software component, residing on said second application server, running on said second application server to initiate said transfer control protocol connection between said second application server and said corresponding one of said terminal servers, those of said N application servers other than said second application server not running, except for said heartbeat function, while said second application server is said coordinator of said group;

wherein said application servers are operatively interconnected by a transmission control protocol/internet protocol network and said servers make said determinations by said heartbeat function sending multicast heartbeats over said transmission control protocol/internet protocol network.

7. The system of claim 6, wherein said N application servers are cooperatively configured to determine that said first application server is said coordinator of said group by said first application server being a first one of said N application servers to ask whether it is said coordinator of said group.

8. The system of claim 7, wherein said N application servers are further cooperatively configured to continue to determine whether said first application server is said coordinator even while said connection to said billing system is established by said first application server.

9. The system of claim 7, wherein said heartbeats are sent out by said instances of said software component.

10. The system of claim 7, wherein each of said billing systems, with a corresponding one of said terminal servers, is located in one of several head ends of a broadband communications system.

11. The system of claim 10, wherein said broadband provisioning system is located in one of said head ends.

12. The system of claim 10, wherein said broadband provisioning system is located in a regional data center operatively coupled to all of said several head ends.

13. A system comprising:

means for determining whether a first application server of a group of N application servers having only a single coordinator, N being at least two, is said coordinator of said group, each of said N application servers having an instance of a software component thereon;

means for, responsive to determining that said first application server is said coordinator of said group, establishing a connection between said first application server and a billing system, via:

a transfer control protocol connection between said first application server and a terminal server, and a serial cable between said terminal server and said billing system, such that only a single one of said N application servers can connect to said billing system at any given time, said connection between said first application server and said terminal server including an instance of said software component residing on said first application server running on a processor of said first application server to initiate said transfer control protocol connection between said first application server and said terminal server, those of said N application servers other than said first application server not running, except for a heartbeat function, while said first application server is said coordinator of said group;

means for determining whether a second application server of said group of N application servers is said coordinator of said group;

means for, responsive to determining that said second application server is not said coordinator of said group, continuing to check whether said second application server of said group of N application servers is said coordinator of said group;

means for, responsive to said first application server experiencing difficulty, determining that said second application server now is said coordinator of said group; and means for, responsive to determining that said second application server now is said coordinator of said group, establishing a connection between said second application server and said billing system, via:

a transfer control protocol connection between said second application server and said terminal server, and said serial cable between said terminal server and said billing system, said connection between said second application server and said terminal server including an instance of said software component residing on said second application server running on a processor of said second application server to initiate said transfer control protocol connection between said second application server and said terminal server, those of said N application servers other than said second application server not running, except for said heartbeat function, while said second application server is said coordinator of said group;

wherein said means for determining comprise means for sending multicast heartbeats over a transmission control protocol/internet protocol network connecting said N application servers, said means for sending comprising said heartbeat function.

14. The system of claim 13, wherein said means for determining that said first application server is said coordinator of said group comprise means for determining whether said first application server is a first one of said N application servers to ask whether it is said coordinator of said group.

15. The system of claim 14, wherein said means for sending said heartbeats comprise said instances of said software component.

16. The system of claim 14, wherein said means are located, at least in part, within a broadband provisioning system of a broadband communications system.

17. The system of claim 16, further comprising means for said first application server continuing to determine whether said first application server is said coordinator even while said connection to said billing system is established by said first application server.

* * * * *